United States Patent [19]
Larsson et al.

[11] Patent Number: 5,660,940
[45] Date of Patent: Aug. 26, 1997

[54] METHOD FOR PRODUCING ELECTRIC ENERGY IN A BIOFUEL-POWERED FUEL CELL

[75] Inventors: Ragnar Larsson; Börje Folkesson, both of Lund, Sweden

[73] Assignee: Sufucell AB, Helsingborg, Sweden

[21] Appl. No.: 652,475

[22] PCT Filed: Dec. 19, 1994

[86] PCT No.: PCT/SE94/01218

§ 371 Date: Jun. 18, 1996

§ 102(e) Date: Jun. 18, 1996

[87] PCT Pub. No.: WO95/17773

PCT Pub. Date: Jun. 29, 1995

[30] Foreign Application Priority Data

Dec. 20, 1993 [SE] Sweden .................................. 9304203

[51] Int. Cl.⁶ .................................................. H01M 8/20
[52] U.S. Cl. .................................................. 429/13; 429/17
[58] Field of Search .................................. 429/17, 19, 13, 429/2, 101, 14, 105

[56] References Cited

U.S. PATENT DOCUMENTS 4,159,366  6/1979  Thaller .
4,576,878  3/1986  Gahn .
4,661,422  4/1987  Marianowski et al. .................... 429/13

FOREIGN PATENT DOCUMENTS 2 005 602  8/1970  Germany .

*Primary Examiner*—Anthony Skapars
*Attorney, Agent, or Firm*—Oblon, Spivak, McClelland, Maier & Neustadt, P.C.

[57] ABSTRACT

A method for producing electric energy in a biofuel-powered fuel cell, the metal in the first acid metallic salt solution forming a redox pair having a normal potential between −0.1 and 0.7 V and the metal in the second acid metallic salt solution forming a redox pair having a normal potential between 0.7 and 1.3 V, both metals preferably being vanadium which forms the redox pairs vanadium(IV)/(III) and vanadium (V)/(IV), respectively;

- carbohydrate being supplied as fuel to the first reactor (1) and
- the reaction in the first reactor (1) being effected in the presence of platinum or ruthenium as the first catalyst (2).

13 Claims, 1 Drawing Sheet

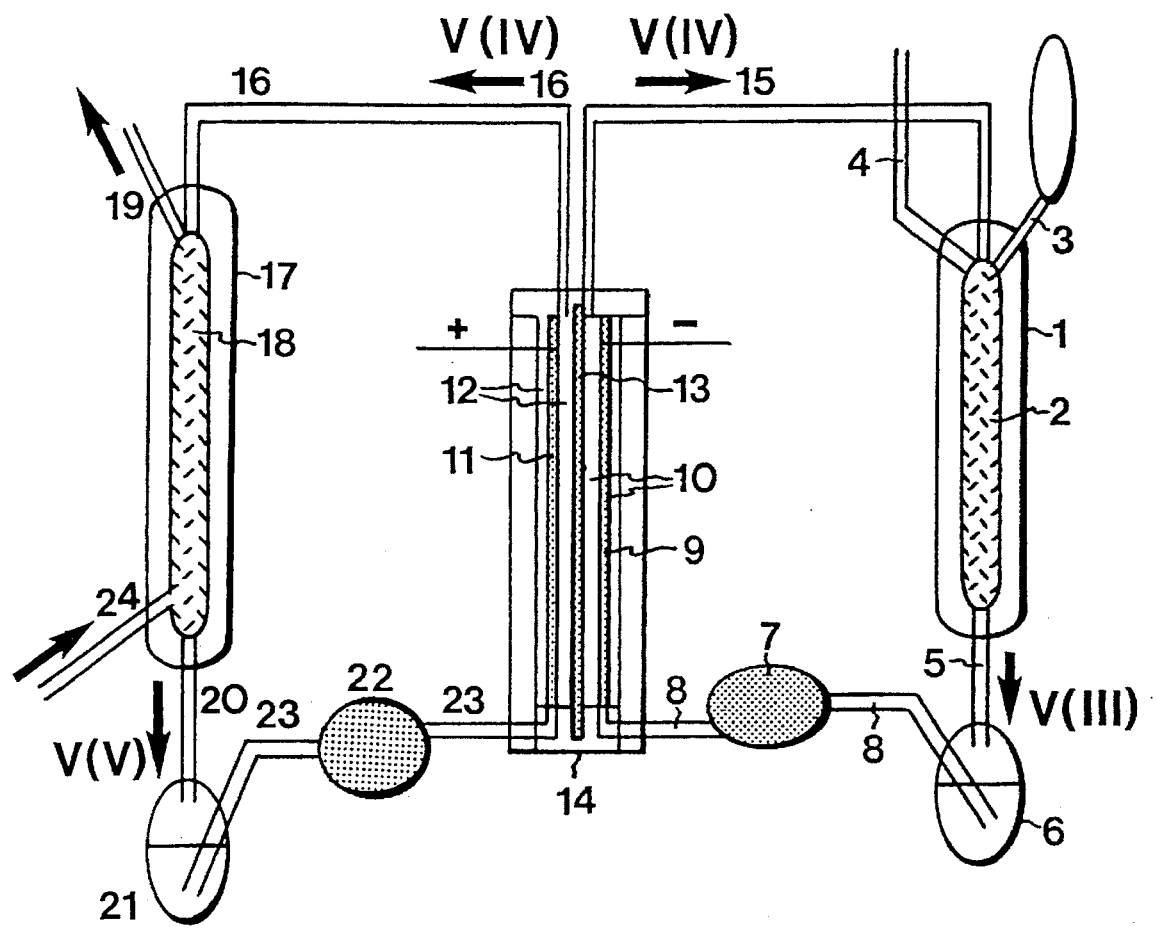

METHOD FOR PRODUCING ELECTRIC ENERGY IN A BIOFUEL-POWERED FUEL CELL

The present invention relates to a method for producing electric energy in a biofuel-powered fuel cell.

PRIOR-ART TECHNIQUE

The most efficient technique so far of converting the chemical energy (combustion heat) of a fuel into electric energy has proved to be the effecting of the conversion in fuel cells. Several types of fuel cells are known. What essentially distinguishes the different fuel cells is the electrolyte which is responsible for the current transfer in the cell, as well as the fuel used. The electrolyte may be, for instance, concentrated alkali or concentrated $H_3PO_4$. In a conventional fuel cell, the fuel is consumed at the negative pole of the cell, thereby forming oxidised products (products of combustion) and transferring electrons to the cathode. The oxidising agent necessary for the combustion, in most cases air or pure oxygen, is converted at the positive pole of the cell such that the oxygen molecule is reduced to water or components of water, such as hydrogen ions or hydroxide ions, electrons being transferred from the anode to the oxidising agent.

The advantage of these fuel cells is that the combustion can be effected at a low temperature, and that the available free energy change (Gibbs' free energy) is in the theoretical case directly converted into electric energy, thereby preventing the power losses which occur in processes in which differences in temperature are utilised, for example in a Carnot heat engine.

Regarding the fuel for fuel cells, practically nothing but hydrogen gas has been used so far. Fuels such as carbon monoxide or methanol may possibly also be used, but they have not yet been found to function in a satisfactory manner. Methanol involves the same drawback as when using hydrogen gas as fuel, i.e. in the production a when using hydrogen gas as fuel, i.e. in the production a considerable amount of carbon dioxide is formed. Hydrogen gas is now produced almost exclusively from natural gas, and the carbon dioxide formed in this process promotes the so-called greenhouse effect.

Prior-art techniques of utilising the energy content of biofuels have comprised, for example, direct combustion thereof, e.g. in the form of wood, and utilisation of the increase in temperature, i.e. the released heat. Moreover, the biofuels have been gasified, thereby obtaining a mixture of hydrogen gas and carbon monoxide, which may then be burnt directly in a suitable apparatus or be chemically combined under the action of a suitable catalyst for forming methanol, methane, paraffin-oil or other carbonaceous fuels. Besides, by a suitable reaction, the biofuel or part thereof can be converted into fermentable sugar, which is subsequently fermented to ethanol. This ethanol may then be used in e.g. internal combustion engines, either separately or mixed with petrol.

It is previously known to use vanadium sulphate or other vanadium compounds in electrochemical cells (see M. Skyllas-Kazacos and F. Grossmith, J. Electrochem. Soc. 134 (1987) 2950; M. Skyllas-Kazacos, M. Rychick and R. Robins, U.S. Pat. No. 4,786,567, 188; B. Sun and M. Skyllas-Kazacos, Electrochim. Acta, 36 (1991) 513; and M. Kazacos, M. Cheng and M. Skyllas-Kazacos, J. Appl. Electrochem. 12 (1982) 87). An electrically renewable accumulator is then involved, which has been developed by Skylla-Kazacos et al. If vanadium-based fuel cells are taken into consideration, and if the used fuel is hydrogen gas, reference can be made to the chemically renewable cells which have been developed by Kummer and Oei (see J. T. Kummer and D. G. Oei, J. Appl. Electrochem. 15 (1985) 619; and J. T. Kummer and D. G. Oei, J. Appl. Electrochem. 12 (1982) 87).

It is also known to use glucose as fuel in fuel cells (see J. R. Rao, G. J. Richter, F. von Sturm and E. Weidlich, Bioelectrochem. Bioenerg. 3 (1976) 139). These fuel cells are adapted to be implanted in the human body for driving a pacemaker. However, the glucose is oxidised to gluconic acid only, and only a small amount of the reducing capacity of the glucose is utilised. Fuel cells in which polyalcohols (see W. Hertl and H. H. Weetall, Bioelectrochem. Bioenerg. 14 (1985) 357; and W. Hertl and R. G. Schaeffler, U.S. Pat. No. 4,578,323, 25 Mar. 1986) or carbohydrates (see W. Hertl and H. H. Weetall, Bioelectrochem. Bioenerg. 14 (1985) 367; and W. Hertl and R. G. Schaeffler, U.S. Pat. No. 4,578,323, 25 March 1986) are used with e.g. anthraquinone as catalyst, are also known, but they require illumination to produce electric current.

Further, there are prior-art methods of producing electricity from redox batteries, for example by means of Ti/Fe (see DOE/NASDA/12 726-24; NASA TM-83677; N. H. Hagedorn, "NASA Redox Storage System Development Project", October 1984; ERDA/NASA 1022/77/10; NASA TM-X-73669; M. A. Reid and R. F. Gahn, "Factors Affecting the Open-Circuit Voltage and Electrode Kinetics of Some Iron/Titanium Redox Flow Cells", 1987; and C. C. Liu, R. T. Galasco and R. F. Savinelli, J. Electrochem. Soc. 126 (1979) 357, 128 (1981) 1755; 129 (1982) 2502), or vanadium(V)/vanadium(II) (see M. Skyllas-Kazacos and F. Grossmith, J. Electrochem. Soc. 134 (1987) 2950), but in all these systems, electricity and not a chemical reaction is used for recharging.

BACKGROUND OF THE INVENTION

It is thus not previously known to use carbohydrates as fuel in combination with vanadium in the solution of electrolytes for producing electric energy in a fuel cell. None of the above-mentioned publications describes or indicates the use of said combination.

It is a global ambition to find alternative methods of producing electric energy, including alternative fuels for e.g. vehicle engines. Sooner or later, the fossil fuels of the earth will be depleted, also including all the uranium accessible, which means that the use of biofuels, i.e. fuels based on cultivatable, biological materials, may become most interesting. Moreover, a relief of the so-called greenhouse effect, which arises owing to, inter alia, increased amounts of carbon dioxide discharged to the atmosphere, is aimed at.

OBJECT OF THE INVENTION

The object of the present invention is to provide a method for producing electric energy of high efficiency in a fuel cell by using a fuel which is environmentally acceptable, easily accessible and safe.

This object is achieved by means of a method of the type mentioned by way of introduction and having the features recited in the characterising clause of the appended claims.

SUMMARY OF THE INVENTION

According to the present invention, a method for producing electric energy in a biofuel-powered fuel cell is provided, in which method fuel is supplied to a first reactor 1 in the negative pole compartment of the fuel cell, in which said fuel is, under the action of a first catalyst 2, reacted with a first acid metallic salt solution for complete oxidation of the fuel to carbon dioxide and reduction of the metal;

the $CO_2$ formed is discharged from said first reactor 1;

said first acid salt solution of reduced metal is passed to an anode 9 in an electrochemical cell 14 for oxidising the metal;

said first acid metallic salt solution is subsequently recirculated to the reactor 1;

an oxidising agent is supplied to a second reactor 17 in the positive pole compartment of said fuel cell, in which the oxidising agent is, under the action of a second catalyst 18, reacted with a second acid metallic salt solution for oxidising the metal therein;

the residual product formed is discharged from the reactor 17;

the second acid metallic salt solution is subsequently passed to a cathode 11 in the electrochemical cell 14 for reducing the metal;

the second acid metallic salt solution is subsequently recirculated to the second reactor 17, the anode 9 and the cathode 11 of the electrochemical cell 14 being separated merely by a hydrogen ion permeable membrane 13, through which hydrogen ions from the cathode 11 are transferred to the anode 9 for producing electric energy, said method being characterised in that the metal in said first acid metallic salt solution forms a redox pair having a normal potential between −0.1 and 0.7 V, and that the metal in said second acid metallic salt solution forms a redox pair having a normal potential between 0.7 and 1.3 V, both metals preferably being vanadium, which forms the redox pairs vanadium(IV)/(III) and vanadium(V)/(IV), respectively;

that carbohydrate is supplied as fuel to said first reactor 1, and that the reaction in said first reactor 1 is effected in the presence of platinum or ruthenium as the first catalyst 2.

According to the present invention, the energy content of the carbohydrate, more specifically the sugar, is utilised to a far higher degree than has been possible with previous fuel cells, in which glucose is used as fuel. A definitely higher efficiency is achieved, especially because of the utilisation of vanadium in the solution of electrolytes of the fuel cell. Compared to the use of sugar as raw material for producing ethanol, and then the use of the ethanol in an internal combustion engine, the present method must be preferred, since a higher degree of efficiency is achieved. This depends on the one hand on a higher theoretical efficiency of the fuel cell as compared to a heat engine and, on the other hand— when impelling an electric vehicle—a higher efficiency of the electric motor. The advantages of using biofuels, such as carbohydrates, are that in general the supply thereof is rich, and that they are environmentally relatively acceptable and quite nonpoisonous as fuels. Moreover, sugars which are not fermentable to ethanol may be used. Although, according to the present invention, carbon dioxide forms in the complete combustion of the carbohydrates, this occurs in an amount which is approximately as large as is required by nature for reproducing carbohydrates. From the viewpoint of Swedish agricultural policy, the present invention confers great advantages since it leads to maintaining the agriculture developed in centuries and safeguarding the type of landscape that is appreciated by all of us.

The voltage generated in the battery used for the present invention is D.C. voltage. This opens a range of application for the electrochemical industry, for e.g. the chlorine/alkali production. In this context, power losses owing to transformation and rectification are prevented. The fuel can be supplied to the electrochemical industry locally and there be converted into electric power.

DESCRIPTION OF THE DRAWING

The invention will now be described in more detail with reference to the accompanying drawing which essentially corresponds to the fuel cell as described by J. T. Kummer and D. G. Oei, J. Appl. Electrochem. 12 (1982) 87 and 15 (1985) 619, respectively.

The drawing concerns a fuel cell for producing electric energy. For the purpose of simplification, the fuel cell can be considered to be divided into two compartments. In the same compartment as the negative pole of the fuel cell, i.e. to the right in the drawing, there is a first reactor 1 containing a catalyst 2. A fuel conduit 3 for supplying fuel extends to the reactor 1. From the reactor 1 extends an outlet duct 4 for discharging any undesired reaction product, and a duct 5 for conveying a solution of electrolytes to a first container 6. The solution of electrolytes can be conveyed from the container 6 by means of pump 7 through a conduit 8 to the negative pole of an electrochemical cell 14. The electrochemical cell 14 is divided into two compartments by means of a membrane 13. A first cell compartment 10 holds an anode 9, and a second cell compartment 12 holds a cathode 11. The two cell compartments 10 and 12 and, consequently, also the anode 10 and the cathode 11 are thus separated by the membrane 13. From the first cell compartment 10 extends a conduit 15 for returning the solution of electrolytes to the first reactor 1. From the second cell compartment 12, which is positioned in the same half as the positive pole of the fuel cell, extends a conduit 16 for returning the solution of electrolytes to a second reactor 17, which comprises a second catalyst 18. From the second reactor 17 extend an outlet duct 19 and a duct 20 for conveying the solution of electrolytes to a container 21. To the second reactor 17 extends an inlet duct 24 for supplying oxygen. By means of a pump 22, the solution can be passed via a duct 23 back to the second cell compartment 12. The fuel cell thus contains two separate circulation systems, one in each half, in which the two circulating solutions of electrolytes are separated merely by the membrane 13 in the electrochemical cell 14.

DESCRIPTION OF EMBODIMENTS

The carbohydrate used as biofuel may comprise monosaccharides such as glucose, fructose, disaccharides such as maltose, saccharose (cane sugar, beet sugar), and penroses such as xylose and arabinose. The carbohydrate may also comprise polysaccharides which can be hydrolysed to monosaccharides, for example cellulose, starch and amylose. Also molasses or a hydrolysis product thereof is included. Preferably, use is made of common sugar, i.e. saccharose having the formula $C_{12}H_{22}O_{11}$, glucose having the formula $C_6H_{12}O_6$, and xylose having the formula $C_5H_{10}O_5$. Also other monosaccharides, oligosaccharides and hydrolysis products of polysaccharides, not enumerated here, are included in the term carbohydrate.

Preferably, common sugar is supplied to the reactor 1. The sugar may be added in solid form, also oligo- and polysaccharides, but may also be dissolved in advance in a suitable solution. The concentration of sugar in the reactor 1 should be in the range of about 0.001–0.1M, preferably about 0.003M. The first catalyst 2 in the first reactor 1 is made of a precious metal, preferably ruthenium or platinum, most advantageously platinum. Its object is to completely oxidise sugar according to the reaction $$C_{12}H_{22}O_{11}+13H_2O \rightarrow 12CO_2+48H^++48e^-$$

The first catalyst 2 is present in a finely divided state, either separately or dispersed on a carrier. As carrier material for the Catalyst metal, use is preferably made of carbon, silicon dioxide, titanium dioxide, zirconium dioxide or some other material that does not dissolve in the acid solution of electrolytes and at the relatively high temperature. Moreover, the catalyst is adapted not to leave the first reactor 1 together with the circulating solution of electrolytes. The sugar supplied to the first reactor 1 is dissolved in and reacts with the solution of electrolytes, which is an acid metallic salt solution. The acid metallic salt solution consists of a salt of a metal dissolved in a strong acid. The strong acid is preferably sulphuric acid or phosphoric acid, most advantageously sulphuric acid, and has a concentration of about 0.05 to about 5.0M. The acid metallic salt solution has a pH of −0.7 to 1.0. Also other acids which are not volatile and do not oxidise are useful. The concentration of sugar, metallic salt and acid in the solution is mutually related and varies within the limits stated.

The metal in the acid metallic salt solution should be such as to form a redox pair with favourable properties for the method according to the present invention. The demand on the metallic salt system used at the negative pole of the fuel cell is that the normal potential for the redox pair involved is greater than −0.1 V and less than 0.7 V. The metal which has been found to be the most suitable one according to the present invention is vanadium, but also molybdenum and some iron complexes can be used. The metallic salt preferably used is vanadium(IV)sulphate, $VOSO_4$, since it is easily accessible and has been found to be suitable for this purpose. Also $V_2O_5$ can be used, but not as successfully.

In the presence of the first catalyst 2, the dissolved sugar reacts with the acid solution containing vanadium sulphate in which vanadium has the oxidation number +IV, whereby the vanadium is reduced so as to have the oxidation number +III. Besides, the vanadium can to a certain extent be reduced to the oxidation state +II, but the +III form is predominant. The total reaction occurring in the first reactor 1 is as follows:

$$C_{12}H_{22}O_{11}+48VO^{2+}+48H^+ \rightarrow 12CO_2+48V^{3+}35H_2O$$

The carbon dioxide formed in the reaction is discharged through the outlet duct 4 to the open. After the reaction in the first reactor 1, the reduced metallic salt solution is passed to the first container 6, from which it is pumped by means of the pump 7 through the conduit 8 to the electrochemical cell 14. The reduced metallic salt solution is passed specifically into the first cell compartment 10 at the negative pole of the electrochemical cell 14. The electrochemical cell 14 is surrounded by a cell casing of polypropylene. The reduced metallic salt solution reaches in the first cell compartment 10 the anode 9, which preferably is a porous pressed felt of graphite. Connected to the anode 9, there is at each end an electric switch. This also applies to the cathode 11. Under the action of the electrode, the metal in the metallic salt solution is oxidised to a higher oxidation number, i.e. vanadium obtains once more the oxidation number +IV. Subsequently, the oxidised metallic salt solution is discharged from the first cell compartment 10 and recirculated through the conduit 15 back to the first reactor 1, whereupon the above-described procedure in this compartment of the fuel cell is repeated.

In the second compartment of the fuel cell, i.e. in the half in which the positive pole of the electrochemical cell 14 is to be found, an oxidising agent, such as air or pure oxygen, is supplied to the second reactor 17 through the duct 24. Here, oxygen reacts, under the action of the second catalyst 18, with the solution of electrolytes, which is a second acid metallic salt solution and which can differ from or be the same as the acid metallic salt solution leaving the first cell compartment 10 in the electrochemical cell 14 in the other circulation system as described above. Preferably, the acid metallic salt solutions have identical properties in both cell compartments. Like in the other circulation system, the acid is preferably sulphuric acid or phosphoric acid, most advantageously sulphuric acid, and may vary within the same pH limits. For the metal in the metallic salt solution in this compartment of the fuel cell, i.e. the positive pole compartment, the same conditions apply as in the other compartment described above. The second catalyst 18 is a solid substance which is practically insoluble in acid and which catalyses the oxidation of the metallic salt to a higher oxidation state under the action of the oxygen in the air. Preferably, vanadium is oxidised from the oxidation number +IV to the oxidation number +V, but also other suitable metallic salts can be oxidised from a lower to a higher oxidation number, e.g. molybdenum and iron. Instead of air, pure oxygen can be injected. The demand on the metallic salt system, which is used at the positive pole, is that the normal potential of the redox pair involved in this case is less than 1.3 V and greater than 0.7 V. The normal potential of vanadium in the positive pole compartment is 1.0 V and in the negative pole compartment 0.34 V in the fuel cell. The second,catalyst 18 can be a catalyst of conventional type, which is used in the technique for effecting the electrode reaction at the positive pole in a conventional fuel cell, but it may also be a different chemical system, for example $HNO_3/NO$ (see J. T. Kummer and D. G. Oei, J. Appl. Electrochem. 15 (1985) 619).

In the second reactor 17, the reaction, when using vanadium as metal, is as follows:

$$O_2+4VO^{2+}+2H_2O \rightarrow 4VO_2^++4H^+$$

Thus, vanadium is oxidised to a higher oxidation number (+V), whereupon the acid metallic salt solution oxidised in the reaction in the second reactor 17 passes from the same through the duct 20 to the second container 21, from which it is pumped by means of the pump 22 through the duct 23 to the second cell compartment 12 in the electrochemical cell 14. Under the action of the cathode 11, the metal in the acid metallic salt solution is reduced to a lower oxidation number (+IV), whereupon the solution is recirculated through the conduit 16 back to the second reactor 17 for repeating the procedure as described above at the positive pole of the fuel cell. From the second reactor 17, the nitrogen gas formed, if air is used as oxidising agent, is discharged to the open air through the duct 19.

According to the present invention, the metal in the acid metallic salt solution in the two circulation systems of the fuel cells is, as mentioned above, preferably the same substance, vanadium being especially preferred. The redox pairs concerned are then V(V)/V(IV) and V(IV)/V(III), respectively. In the compartment of the fuel cell, which represents the negative pole, the metallic salt is thus present essentially in a lower oxidation state, and in the cell compartment representing the positive pole in the fuel cell, the metallic salt is present essentially with a higher oxidation number. The voltage between the two electrodes, i.e. the anode 9 and the cathode 11, in the electrochemical cell 14 is dependent on how well this balance between a low and a high oxidation number can be maintained. The current taken from the fuel cell according to the present invention is dependent on the concentration of low- and high-oxidised metal ions in the circulated metallic salt solutions. The two metallic salts should be such as not to allow any undesired type of reaction by a possible diffusion or flow of metallic salt from one to the other cell compartment, i.e. between the cell compartments 10 and 12. The membrane 13, which separates the two circulation systems, is designed so as to permit proton transport only. The above-mentioned undesired reactions can be such as to result in precipitation of at least one of the active salts, a coating on the membrane so as to change its pores, or effects on the potential or the potential adjusting speed at the respective electrode.

The electrodes, i.e. the anode 9 and the cathode 11, can be made of metal or some other conductive material and be designed such that a high conversion of the reduced and, respectively, oxidised metallic salt occurs at the surface. The highest possible exchange current per external surface of the electrode at issue is thus aimed at. According to the present invention, use is made of a porous electrode surface. Moreover, additives to the electrode material may be used to increase the exchange current. These additives can be either precious metals or so-called redox systems, whose normal potential is close to that of the redox system of the metallic salts. The used membrane 13 is made of, for example, polyethylene or polypropylene, whose pores are filled with a suitable material permitting proton transport, while preventing the solutions from flowing freely between the respective cell compartments. An example of filling materials is silica gel or some other inorganic, amphoteric material which is insoluble in acid.

When using the fuel cell according to the present invention, a temperature of preferably max. 150° C., most advantageously about 90°–105° C., is used continuously in the fuel cell.

It is thus the unique combination of carbohydrate as fuel, vanadium in acid solution and platinum as the first catalyst 2 in a fuel cell, which permits production of electric energy with a high degree of efficiency according to the present invention.

EXAMPLES

The invention can be used for producing electric energy on a large or small scale. The example below concerns a small "power plant" which should produce a power of 10 kW. Such a power plant comprises a plurality of components, i.e. the battery of individual cells yielding the electric energy, and the reactors in which the chemical reactions occur. Moreover, auxiliary equipment, such as pumps and control devices, are included.

In a preferred example, common cane sugar (sacharose) is supplied to the first reactor 1. The acid metallic salt solution is vanadium(IV)sulphate dissolved in phosphoric acid. The phosphoric acid concentration is 5M (5 moles/liter=490 g phosphoric acid/liter) and the sugar concentration is 0.003M (1.03 g sugar/liter). By using platinum having a specific surface of 100 $m^2/g$ as the first catalyst 2, a sufficiently high chemical reaction rate is obtained for producing the desired power at a vanadium sulphate concentration of 0.3M (49 g $VOSO_4$/liter).

The obtained chemical reaction rate at a temperature for the first reactor 1 of 100° C. is 3 moles vanadium/h. This means that 489 g (3×163 g) $VOSO_4$ has been reduced by the sugar during 1 h. According to Faraday's law, which is known to those skilled in the art, this chemical reaction rate can be converted into current intensity, i.e. the converted quantity of electricity per time unit. In this example, the current intensity is 78 A/liter reaction solution when using 1.25 g platinum catalyst. To obtain a power of 10 kW, a fuel cell can be provided according to the enclosed drawing so as to produce a cell voltage of 0.7 V when the cell yields so much current that the load per surface unit of the electrodes is 15 $mA/cm^2$. At this voltage, a quantity of current of 14,285 A (10,000 W/0.7 V) must be produced. The volume of the first reactor 1, in which the sugar reacts, must thus be 183 liters (14,285/78) and contain a catalyst amount of 229 g platinum (183×1.25).

The second reactor 17 for oxidising vanadium(IV) to vanadium(V) is of approximately the same size as the first reactor 1. In the second reactor 17, use is also made of a solid or soluble catalyst 18 having a redox potential in the range of 0.8–1.2, e.g. a phthalocyanine preparation of a suitable metal, preferably cobalt, or nitrogen dioxide/nitric acid.

The electrochemical cell according to the invention preferably has a cell voltage of about 0.7 V. For obtaining a useful electric voltage, a large number of individual cells must be connected in series. A suitable voltage, which is used in e.g. experiments with electrically driven vehicles, is 90 V. In this example, this voltage is used, and then the number of cells connected in series is 130. In this example, 4 units of 130 cells connected in series have been connected in parallel. The surface of the electrodes in each unit is 18.5 $dm^2$ (for example 4× 4.6 dm), which yields a total electrode surface for the entire battery of 74 $dm^2$. The above-mentioned current density of 15 $mA/cm^2$ results in a current intensity of 111 A (15×74×100 mA). The product of cell voltage and current intensity will then be 10 kW (90 V×111 A).

In a preferred example, the electrochemical cell 14 is enclosed by a 3-mm-thick cell casing. The space between the cell casing and the cathode 11 or anode 9 is 0.5 mm. Both electrodes have a thickness of 2 mm, and the fluid layer between electrode and membrane is 0.5 mm thick. The membrane is 1 mm thick and the electrode surface is 18.5 $dm^2$ (4×4.6 dm). The same dimensions apply to both halves in the electrochemical cell 14. This means a total thickness of the electrochemical cell of 13 mm. 130 cells in series then yield a minimum length of 17 dm (130×0.13 dm). The volume of one unit will then be 313 liters (17 dm×19 $dm^2$), and the total volume will be 1250 liters (4×313 liters). This gives a current density of 10 kW/1250 liters, i.e. 8 W/liter. The theoretical cell voltage of a sugar fuel cell is 1.25 V. The electric efficiency will thus be 56% (0.7/1.25).

We claim:

1. A method for producing electric energy in a biofuel-powered fuel cell, comprising supplying carbohydrate fuel to a first reactor in a negative pole compartment of the fuel cell containing a precious metal as a first catalyst, reacting said fuel with a first acid metallic salt solution for complete oxidation of the fuel to carbon dioxide and reduction of the metal;

discharging said carbon dioxide formed from said first reactor;

passing said acid salt solution containing reduced metal to an anode in an electrochemical cell to oxidize the metal and subsequently recirculating it to the first reactor;

supplying an oxidizing agent to a second reactor in a positive pole compartment of said fuel cell containing a second catalyst to react with a second acid metallic salt solution to oxidize the metal therein;

discharging a residual product formed from said second reactor;

passing the oxidized second acid metallic salt solution to a cathode in an electrochemical cell to reduce the metal;

recirculating the second acid metallic salt solution to the second reactor;

wherein the anode and the cathode of the electrochemical cell is separated by a hydrogen ion permeable membrane through which hydrogen ions from the cathode are transferred to the anode for producing electric energy, and wherein the metal in said first acid metallic salt solution forms a redox pair having a normal potential between −0.1 and 0.7 V, and the metal in said second acid metallic salt solution forms a redox pair having a normal potential between 0.7 and 1.3 V, wherein the redox pair formed is Vanadium (iv)/(iii) or Vanadium (v)/(iv).

2. The method according to claim 1, wherein the carbohydrate fuel is in the form of saccharose, glucose, maltose, xylose and/or arabinose, or cellulose, starch or amylose, or a hydrolysis product of these carbohydrates, or molasses or a hydrolysis product thereof and is supplied as fuel to said first reactor in a concentration of up to about 0.1M.

3. The method according to claim 2, wherein said concentration is 0.003M.

4. The method according to claim 1, wherein the acid in said first and second acid metallic salt solution is sulphuric acid or phosphoric acid in a concentration of about 0.05 to about 5M.

5. The method according to claim 1, wherein said second catalyst has a redox potential in the range of 0.8–1.2.

6. The method according to claim 1, wherein the temperature in the fuel cell is a maximum 150° C.

7. The method according to claim 6, wherein the temperature is 90°–105° C.

8. The method according to claim 1, wherein vanadium in the form of vanadium(IV) sulphate is reacted in said first reactor and/or in said second reactor.

9. The method according to claim 1, wherein a salt of molybdenum, tungsten or iron in said solution is reacted in said first reactor and/or in said second reactor.

10. The method according to claim 1, wherein vanadium in the negative pole compartment of said fuel cell is also reduced to the oxidation state +II.

11. The method according to claim 1, wherein said second is nitric oxide/nitric acid.

12. The method according to claim 1, wherein said precious metal is Pt or Ru.

13. The method according to claim 12, wherein said precious metal is Pt.

* * * * *